(12) United States Patent
Brown, IV et al.

(10) Patent No.: US 11,760,437 B2
(45) Date of Patent: Sep. 19, 2023

(54) NON-UNIFORM STEERER TUBE OR FORK LEG

(71) Applicant: Fox Factory, Inc., Duluth, GA (US)

(72) Inventors: William O. Brown, IV, Aptos, CA (US); Daniel McCormick, Santa Cruz, CA (US); Joshua Coaplen, Asheville, NC (US); Christopher Otterness, Asheville, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/708,844

(22) Filed: Mar. 30, 2022

(65) Prior Publication Data
US 2023/0020325 A1    Jan. 19, 2023

Related U.S. Application Data

(63) Continuation of application No. 16/692,923, filed on Nov. 22, 2019, now Pat. No. 11,292,550, which is a continuation-in-part of application No. 16/659,272, filed on Oct. 21, 2019, now Pat. No. 11,305,834.

(60) Provisional application No. 62/751,929, filed on Oct. 29, 2018.

(51) Int. Cl.
B62K 21/04    (2006.01)
B62K 21/02    (2006.01)

(52) U.S. Cl.
CPC .............. B62K 21/04 (2013.01); B62K 21/02 (2013.01)

(58) Field of Classification Search
CPC ..................................................... B62K 21/04
See application file for complete search history.

(56) References Cited

U.S. PATENT DOCUMENTS

| | | | | |
|---|---|---|---|---|
| 4,531,756 A | * | 7/1985 | Mori ....................... | B62K 19/32 280/279 |
| 6,655,707 B2 | * | 12/2003 | Buckmiller ............ | B62K 19/16 280/279 |
| 7,296,813 B2 | * | 11/2007 | Montague .............. | B62K 15/00 280/279 |
| 7,543,835 B2 | | 6/2009 | Murphy et al. | |
| 7,614,631 B2 | | 11/2009 | Chao | |
| 7,909,346 B2 | | 3/2011 | Moechnig | |
| 7,950,681 B2 | | 5/2011 | Lewis et al. | |
| 8,083,246 B2 | | 12/2011 | White | |
| 8,366,130 B2 | | 2/2013 | Galasso et al. | |
| 10,005,512 B2 | * | 6/2018 | Sime ....................... | B62K 21/16 |
| 10,328,993 B2 | | 6/2019 | Watt et al. | |
| 10,442,492 B2 | * | 10/2019 | Taylor .................... | B62K 21/16 |
| 10,850,791 B2 | * | 12/2020 | D'Aluisio .............. | B62K 19/32 |
| 11,155,318 B2 | * | 10/2021 | Chong .................... | B62K 21/16 |
| 11,292,550 B2 | * | 4/2022 | Brown, IV ............. | B62K 21/12 |
| 11,305,834 B2 | | 4/2022 | Brown, IV et al. | |
| 2002/0139217 A1 | * | 10/2002 | Montague .............. | B62K 21/16 74/493 |
| 2015/0291246 A1 | | 10/2015 | Achenbach et al. | |
| 2016/0185414 A1 | | 6/2016 | Watt et al. | |

\* cited by examiner

*Primary Examiner* — Minnah L Seoh
*Assistant Examiner* — Hosam Shabara

(57) ABSTRACT

A fork assembly including a steerer tube and a crown, wherein the steerer tube is fixedly aligned to the crown in a predefined orientation at a time of manufacture.

19 Claims, 19 Drawing Sheets

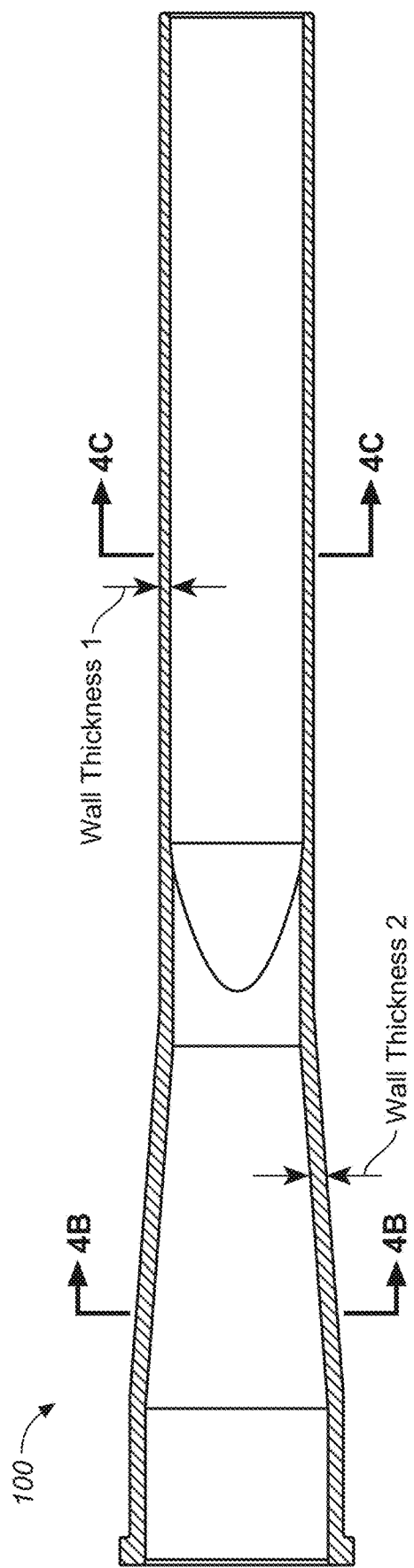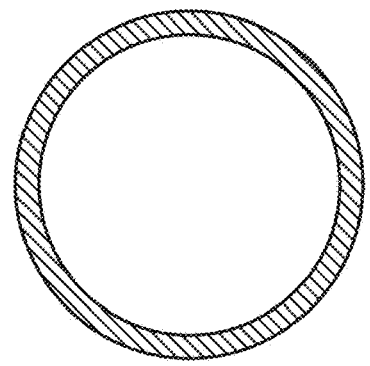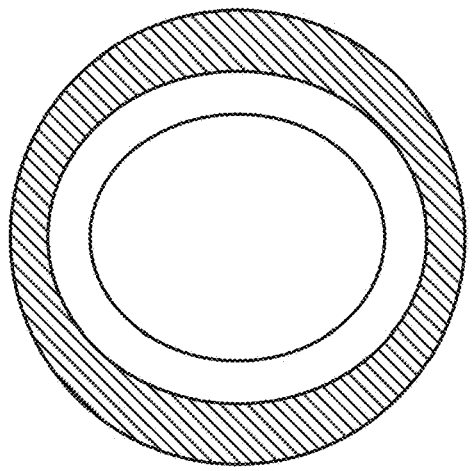

NON-UNIFORM STEERER TUBE OR FORK LEG

CROSS-REFERENCE TO RELATED APPLICATIONS

This application is a Continuation and claims the benefit of and claims priority to the U.S. patent application Ser. No. 16/692,923, filed on Nov. 22, 2019, entitled "NON-UNIFORM STEERER TUBE OR FORK LEG" by William O. Brown, I V et al., assigned to the assignee of the present application, and is hereby incorporated by reference in its entirety.

The application Ser. No. 16/692,923 is a Continuation-in-Part and claims the benefit of and claims priority to the U.S. patent application Ser. No. 16/659,272 filed on Oct. 21, 2019, entitled "NON-UNIFORM STEERER TUBE OR FORK LEG" by William O. Brown, I V et al., assigned to the assignee of the present application, and is hereby incorporated by reference in its entirety.

U.S. patent application Ser. No. 16/659,272 filed on Oct. 21, 2019 claims the benefit of and claims priority to the U.S. Provisional Patent Application No. 62/751,929 filed on Oct. 29, 2018, entitled "NON-UNIFORM STEERER TUBE OR FORK LEG" by William O. Brown, I V et al., assigned to the assignee of the present application, and is hereby incorporated by reference in its entirety.

FIELD OF THE INVENTION

Embodiments of the present technology relate generally to a steerer tube and/or a fork leg.

BACKGROUND

Conventionally a steerer tube is coupled with a fork or other mechanism to enable a user to steer a vehicle such as, but not limited to, a bicycle, a motorcycle, and the like. More specifically, the steerer tube is typically coupled to handlebars using a stem. As a result, movement of the handlebars by a user results in rotation of the steerer tube. Further, as the steerer tube is also ultimately coupled to, typically, the front wheel, rotation of the steerer tube results in turning of the wheel (i.e., non-axial movement of the wheel). Hence, as the steerer is ultimately coupled to the front wheel and to the handlebars, the steerer tube can be subjected to significant forces, torques, vibrations, and the like. Similarly, the fork (or fork legs) of the vehicle can be subjected to significant forces, torques, vibrations, and the like.

BRIEF DESCRIPTION OF THE DRAWINGS

Aspects of the present invention are illustrated by way of example, and not by way of limitation, in the accompanying drawings, wherein:

FIGS. 4A-4C are side-sectional views of one embodiment of a non-uniform steerer tube, in accordance with an embodiment of the present invention.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

As stated above, in some vehicles, a steerer tube is ultimately coupled to a wheel of a vehicle. Similarly, in some vehicles, a fork leg of a fork is ultimately coupled to a vehicle. For purposes of brevity and clarity, the following discussion will refer to embodiments of the present invention corresponding to a steerer tube. It should be noted, however, that various embodiments of the present invention are well suited for use in an upper fork leg, a lower fork leg, or concurrently in both of the upper fork leg and the lower fork leg, or any combination of fork legs in conjunction also with use in a steerer tube. That said, for purposes of brevity and clarity only, and not to be interpreted as a limitation, the following discussion will refer to embodiments of the invention pertaining to a steerer tube.

Figure 1:
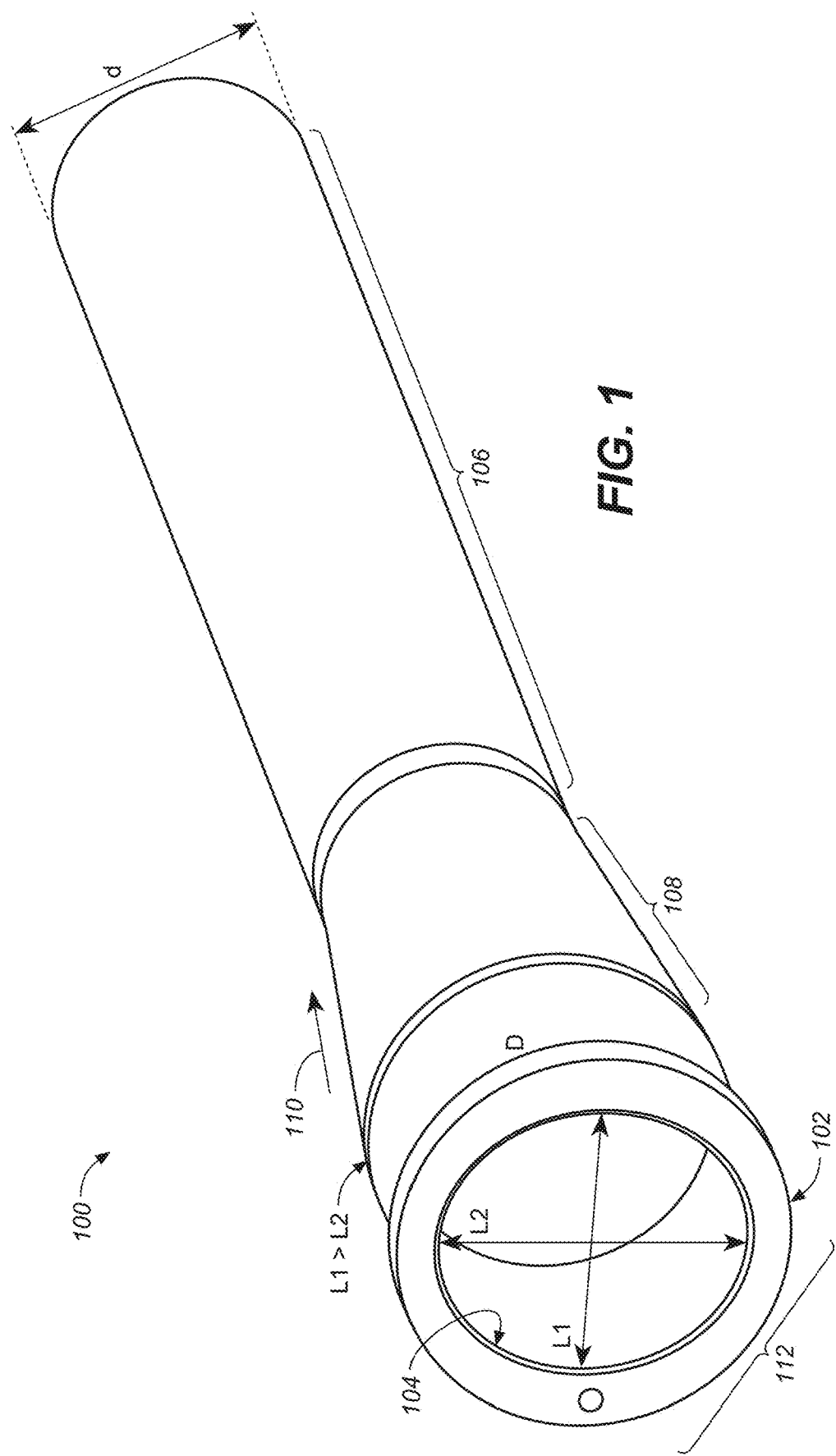
FIG. 1 is a perspective view of a non-uniform steerer tube, in accordance with an embodiment of the present invention.

As will be described in detail below, embodiments of the present invention provide a non-uniform steerer tube. Referring now to FIG. 1, a perspective view is shown of a non-uniform steerer tube 100 in accordance with one embodiment of the present invention. Referring still to FIG. 1, in the present embodiment, non-uniform steerer tube 100 includes an outer surface 102 (may also be referred to an outer diameter) and an inner surface 104 (may also be referred to as an inner diameter). In embodiments of the present invention, outer surface 102 is an axis-symmetric surface of revolution along the axial span (the "axial span" may also be referred to herein as an "axial length") of non-uniform steerer tube 100. That is, in various embodiments, outer surface 102 of non-uniform steerer tube 100 has a uniform diameter. More specifically, outer surface 102 has a uniform diameter length at any given location along the axial span of non-uniform steerer tube 100. It should be noted, however, that the uniform diameter length of outer surface 102 may be different at various locations along the axial span of non-uniform steerer tube 100. For example, it can be seen from FIG. 1, that the outer surface 102 of non-uniform steerer tube 100 has a uniform diameter length, d, along span length portion 106 of non-uniform steerer tube 100. It can further be seen from FIG. 1, that the outer surface 102 of non-uniform steerer tube 100 has a uniform diameter which gradually decreases from a uniform diameter length, D, to a uniform diameter length, d, along span length portion 108 of non-uniform steerer tube 100 in the direction shown by arrow 110.

With reference still to FIG. 1, in embodiments of the present invention, inner surface 104 is not an axis-symmetric surface of revolution along the entire axial span of non-uniform steerer tube 100. That is, in various embodiments, inner surface 104 of non-uniform steerer tube 100 has a non-uniform diameter at, at least, one location along the axial span of non-uniform steerer tube 100. Moreover, in embodiments of the present invention, inner surface 104 may have a non-uniform diameter length at any given location along the axial span of non-uniform steerer tube 100. Additionally, in embodiments of the present invention, inner surface 104 will have a non-uniform diameter length along the entire axial span of non-uniform steerer tube 100. Also, in embodiments of the present invention, inner surface 104 will have a non-uniform diameter length at multiple locations along the axial span of non-uniform steerer tube 100. Furthermore, it should be noted, that in embodiments of the present invention, inner surface 104 may have a uniform diameter length at, at least, one location along the axial span of non-uniform steerer tube 100.

Referring still to FIG. 1, it can be seen that at end 112 of non-uniform steerer tube 100, inner surface 104 has a non-uniform diameter. More specifically, at end 112 of non-uniform steerer tube 100, inner surface 104 has a non-uniform diameter which varies from a maximum length, L1, to a minimum length, L2.

Figure 2:
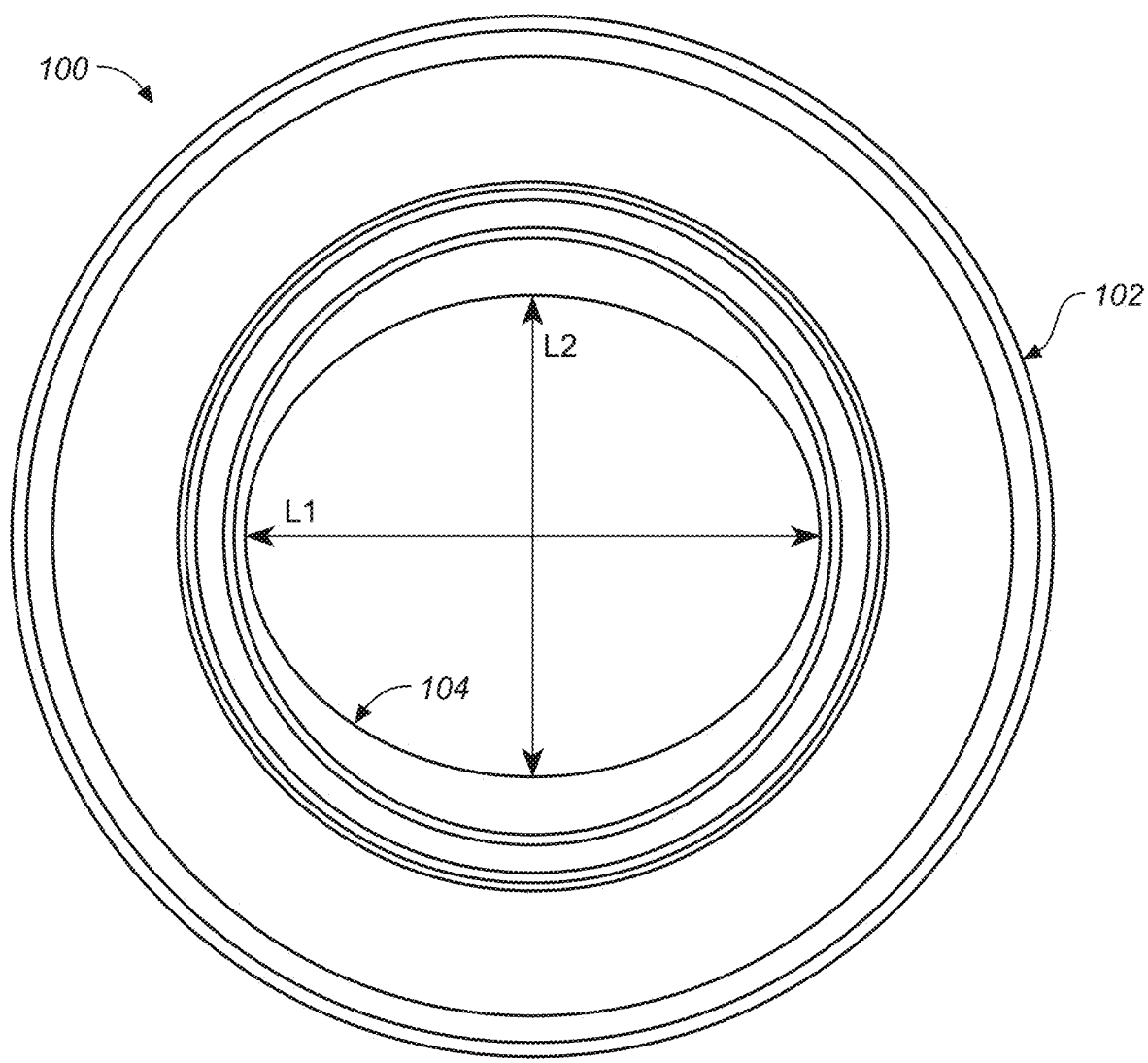
FIG. 2 is a cross-sectional view of the non-uniform steerer tube of FIG. 1, in accordance with an embodiment of the present invention.

Referring next to FIG. 2, a cross-sectional view of non-uniform steerer tube 100 of FIG. 1 is provided in accordance with an embodiment of the present invention. The cross-section of FIG. 2 is taken at, or near, end 112 of non-uniform steerer tube 100. FIG. 2 clearly shows that non-uniform steerer tube 100 has an inner surface 104 with a non-uniform diameter which varies from a maximum length, L1, to a minimum length, L2. Thus, it can be stated that, in various embodiments, non-uniform steerer tube 100 has a round outer profile but non-round inner profile at, at least, some location along the axial span of non-uniform steerer tube 100.

With reference still to FIG. 2, in embodiments of the present invention, non-uniform steerer tube 100 will have an inner surface 104 which is oval in shape. In other embodiments of the present invention, non-uniform steerer tube 100 will have an inner surface 104 which is egg-shaped. In other embodiments of the present invention, non-uniform steerer tube 100 will have an inner surface 104 which is elliptically-shaped. Additionally, in embodiments of the present invention, non-uniform steerer tube 100 will have an inner surface 104 which is rectangularly-shaped. In various embodiments in which non-uniform steerer tube 100 has an inner surface 104 which is rectangularly-shaped, some of the embodiments have sides of different thickness. Importantly, in embodiments of the present invention, regardless of the various examples of shapes and configurations described above, inner surface 104 of non-uniform steerer tube 100 has a non-uniform diameter at, at least, one location along the axial span of non-uniform steerer tube 100.

Figure 3:
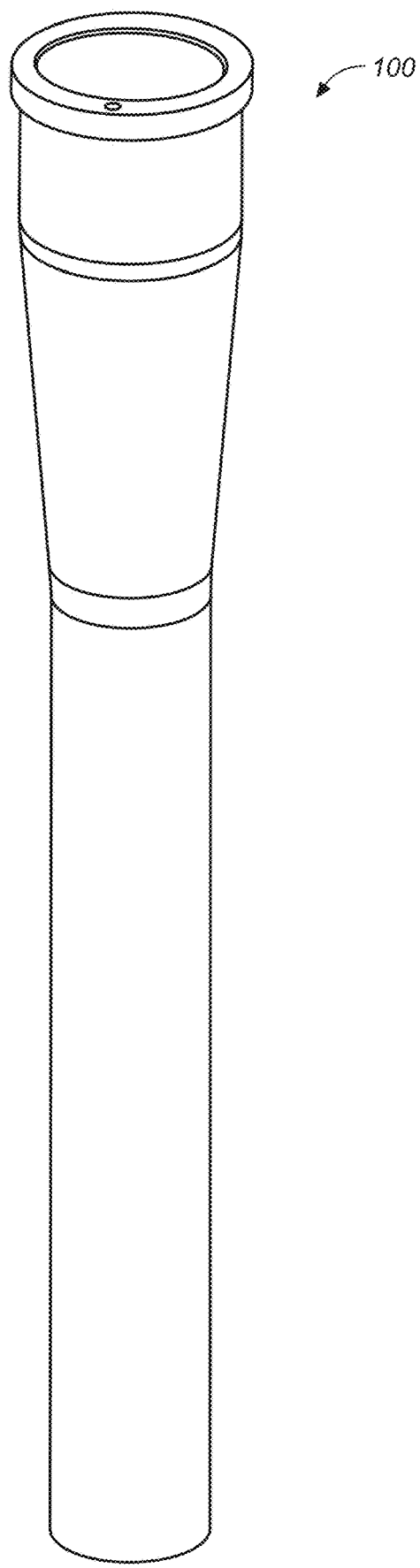
FIG. 3 is a perspective view of the non-uniform steerer tube of FIG. 1 taken from an angle different from that of FIG. 1, in accordance with an embodiment of the present invention.

FIG. 3 provides another perspective view of non-uniform steerer tube 100 taken from an angle different from that of FIG. 1.

FIGS. 4A-4C are side-sectional views of one embodiment of non-uniform steerer tube 100, in accordance with an embodiment of the present invention. In the embodiment of FIGS. 4A-4C, inner surface 104 of non-uniform steerer tube 100 has a non-uniform diameter at section 2 along the axial span of non-uniform steerer tube 100. Further, in the embodiment of FIGS. 4A-4C, inner surface 104 of non-uniform steerer tube 100 has a uniform diameter at section 1 along the axial span of non-uniform steerer tube 100.

Figure 5A:
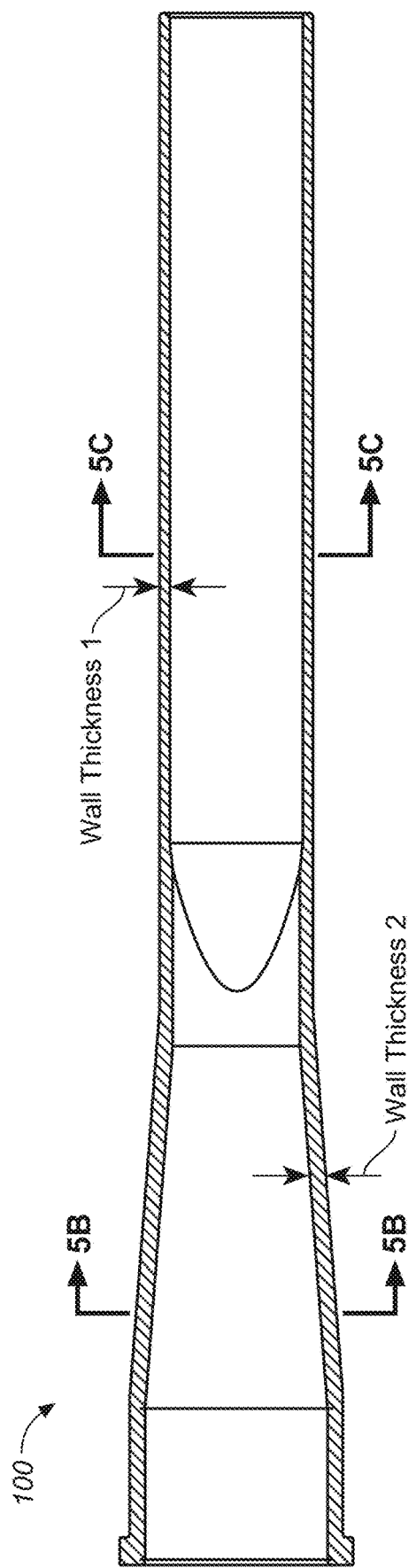
FIGS. 5A-5C are side-sectional views of another embodiment of a non-uniform steerer tube, in accordance with an embodiment of the present invention.
Figure 5C:
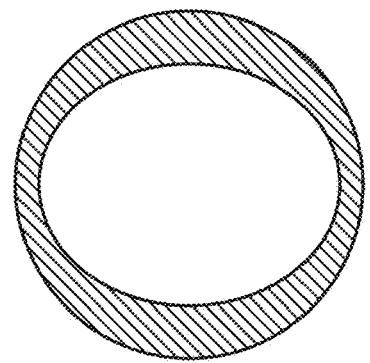
Figure 5B:
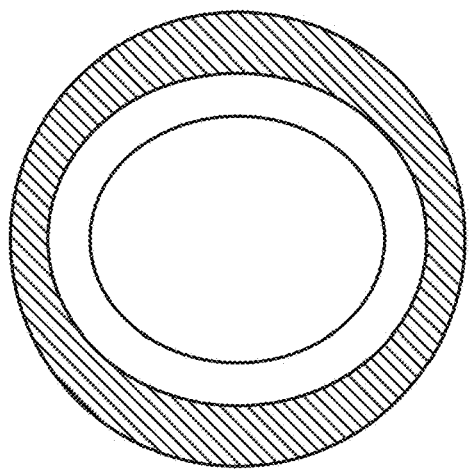

FIGS. 5A-5C are side-sectional views of another embodiment of non-uniform steerer tube 100, in accordance with an embodiment of the present invention. In the embodiment of FIGS. 5A-5C, inner surface 104 of non-uniform steerer tube 100 has a non-uniform diameter at section 2 along the axial span of non-uniform steerer tube 100. Further, in the embodiment of FIGS. 5A-5C, inner surface 104 of non-uniform steerer tube 100 also has a non-uniform diameter at section 1 along the axial span of non-uniform steerer tube 100.

Figure 6A:
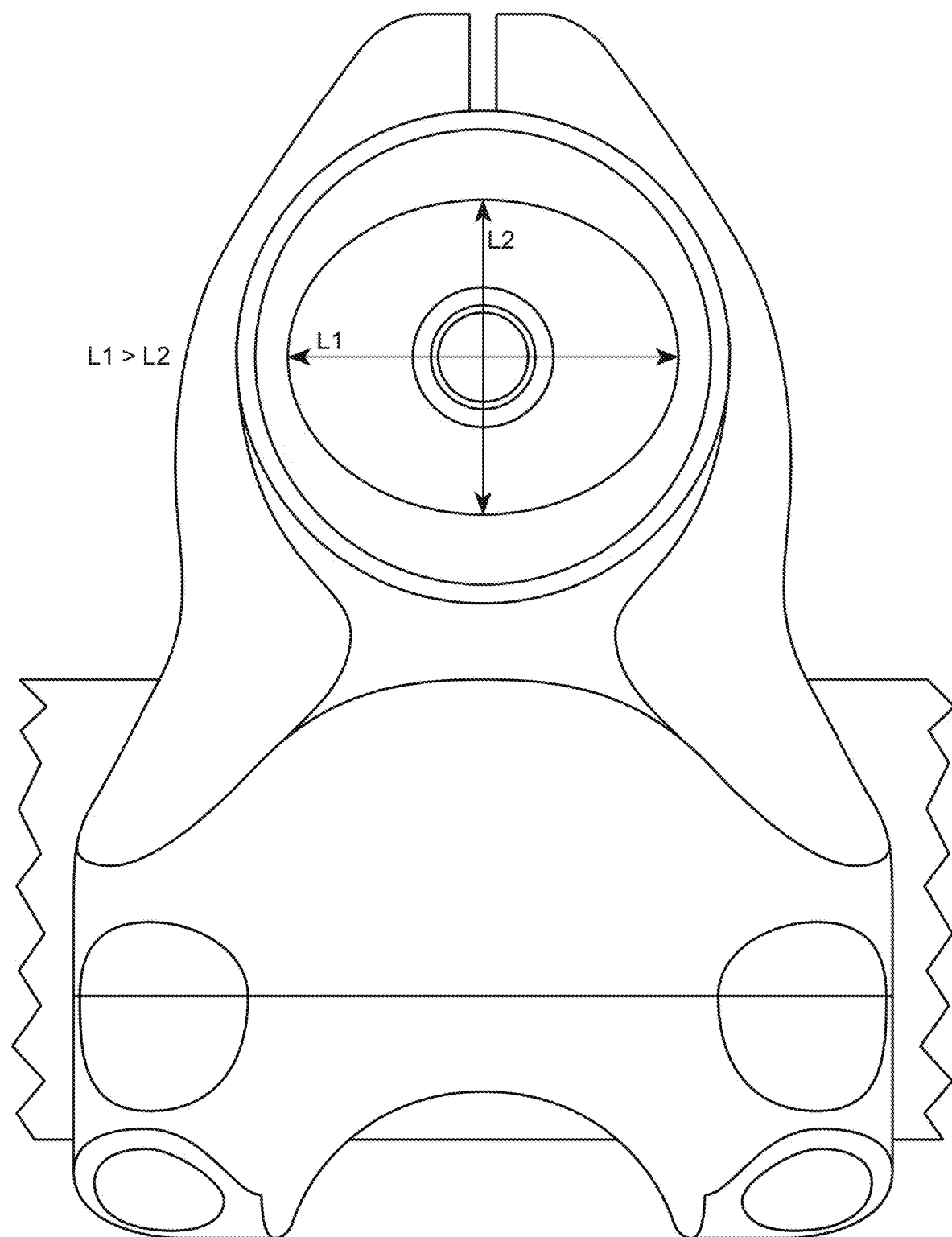
FIGS. 6A-6C are perspective views of a non-uniform steerer tube located on a bicycle, in accordance with an embodiment of the present invention.
Figure 6B:
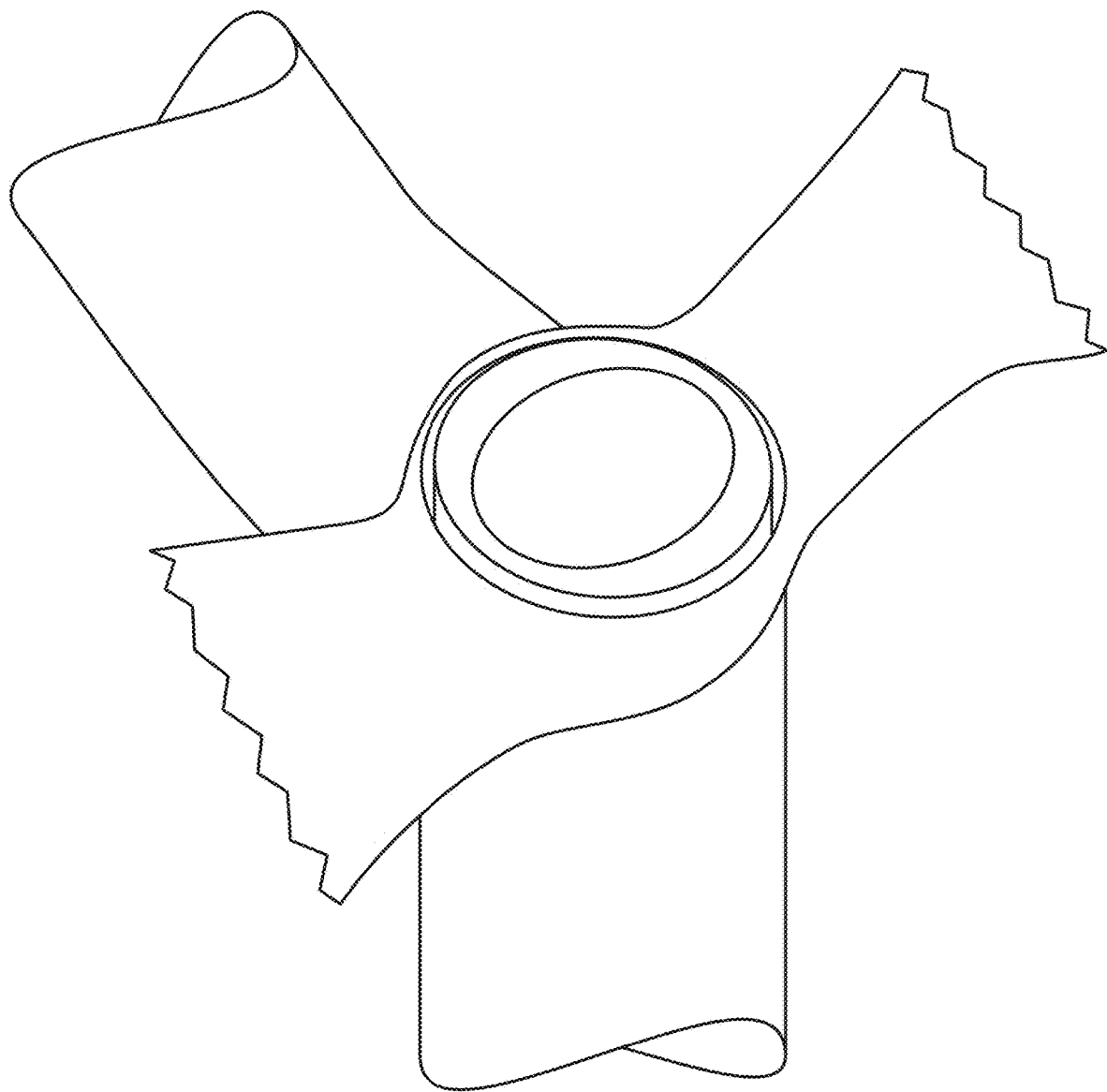
Figure 6C:
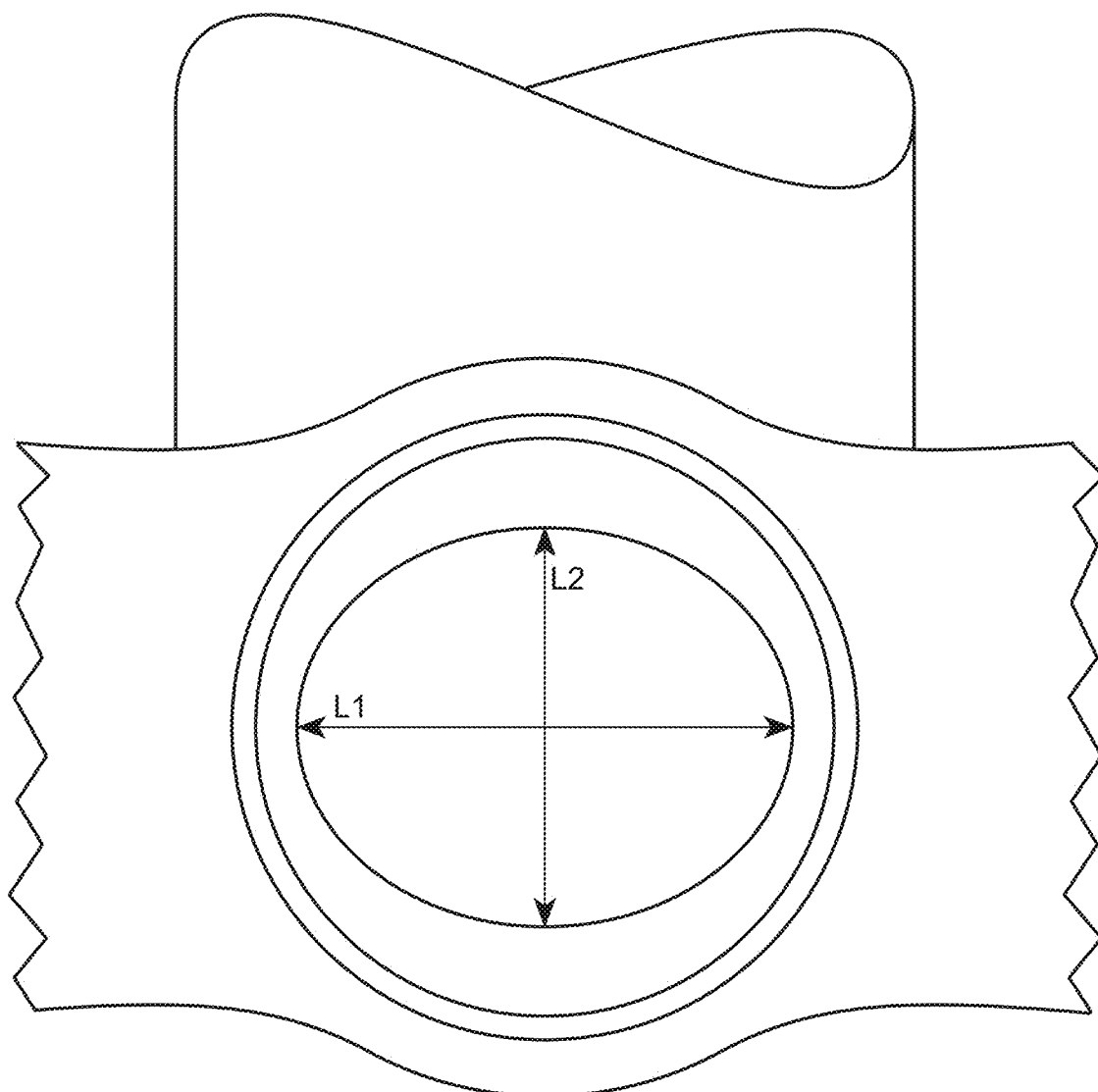

FIGS. 6A-6C are perspective views of a non-uniform steerer tube located on a bicycle, in accordance with an embodiment of the present invention.

In the various aforementioned embodiments of non-uniform steerer tube 100, the "non-uniformity" of the diameter of inner surface 104 is selected to provide additional support for non-uniform steerer tube 100 at locations thereof which are subjected to greater stress. If it is determined that a particular type of use is subjecting a steerer tube to a "fore and aft" force which is greater than a "side-to-side" force, embodiments of the present non-uniform steerer tube 100 will adjust the non-uniformity of the diameter of inner surface 104 to provide additional support with respect to the fore and aft force. Conversely, if it is determined that a particular type of use is subjecting a steerer tube to a "side-to-side" force which is greater than a "fore and aft" force, embodiments of the present non-uniform steerer tube 100 will adjust the non-uniformity of the diameter of inner surface 104 to provide additional support with respect to the side-to-side force.

In embodiments of the present invention, when used with a vehicle, non-uniform steerer tube 100 will be oriented such that the non-uniformity of the diameter of inner surface 104 provides additional support with respect to an anticipated load. For example, in one embodiment of the present invention, if it is anticipated that the vehicle will experience a fore and aft force/load, non-uniform steerer tube is oriented such that the non-uniformity of the diameter of inner surface 104 of non-uniform steerer tube 100 will provide additional support with respect to the fore and aft force.

As yet another example, in various embodiments of the present non-uniform steerer tube 100, the non-uniformity of the diameter of inner surface 104 is adjusted to provide additional support at the bottom of non-uniform steerer tube 100. As yet another example, in various embodiments of the present non-uniform steerer tube 100, the non-uniformity of the diameter of inner surface 104 is adjusted to provide additional support at the top of non-uniform steerer tube 100. As still another example, in various embodiments of the present non-uniform steerer tube 100, the non-uniformity of the diameter of inner surface 104 is adjusted to provide additional support at both the top and the bottom of non-uniform steerer tube 100.

Additionally, embodiments of the present non-uniform steerer tube 100 adjust the non-uniformity of the diameter of inner surface 104 in response to various frequencies imparted to non-uniform steerer tube 100. In one embodiment, non-uniform steerer tube 100 configures the non-uniformity of the diameter of inner surface 104 such that non-uniform steerer tube 100 reduces and/or changes fore and aft vibrational and/or resonant frequencies. In another embodiment, non-uniform steerer tube 100 configures the non-uniformity of the diameter of inner surface 104 such that non-uniform steerer tube 100 reduces and/or changes side-to-side vibrational and/or resonant frequencies. In still another embodiment, non-uniform steerer tube 100 configures the non-uniformity of the diameter of inner surface 104 such that non-uniform steerer tube 100 reduces and/or changes fore and aft and side-to-side vibrational and/or resonant frequencies.

As a result, embodiments of the present non-uniform steerer tube 100 are able to reduce and/or change the vibrations or other unwanted effects imparted to a vehicle rider based on the conditions that the vehicle and/or non-uniform steerer tube 100 is experiencing.

In various embodiments of the present invention, non-uniform steerer tube 100 "translates" the vibration that will be transferred to the handlebars. That is, by adjusting the non-uniformity of the diameter of inner surface 104, non-uniform steerer tube 100 alters the frequencies (makes the frequencies higher or lower) that are ultimately passed to the vehicle user (via, e.g., the handlebars). It should be further noted that in various embodiments, where it is desired to reduce the amplitude of a particular frequency, non-uniform steerer tube 100 reduces the vibration that will be transferred to the handlebars by adjusting the non-uniformity of the diameter of inner surface 104. Conversely, it should be further noted that in various embodiments, where it is desired to increase the amplitude of a particular frequency, non-uniform steerer tube 100 amplifies the vibration that will be transferred to the handlebars by adjusting the non-uniformity of the diameter of inner surface 104.

Although embodiments of the present non-uniform steerer tube explicitly describe adjusting the non-uniformity of the diameter of inner surface 104, various other embodiments of the present invention adjust the response and operation of the steerer tube by varying the material comprising at least a portion of the steerer tube. It should further be noted that the present invention also includes embodiments is which the non-uniformity of the diameter of inner surface 104 is adjusted, and the material comprising at least a portion of the non-uniform steered tube is varied.

In embodiments of the present invention, outer surface 102 remains circular (at each cross-section) along the span of non-uniform steerer tube 100. Such a configuration has several advantages associated therewith, besides the advantages described above. For example, because the outer surface of non-uniform steerer tube 100 is not altered (i.e., remains circular), non-uniform steerer tube 100 is still well suited to use with conventional bushings, gaskets, stems, and various other components. As a result, the beneficial non-uniform steerer tube 100 of the present embodiments, can still be offered as an industry standard product.

Furthermore, as yet another benefit, as outer surface 102 remains circular (at each cross-section) along the span of non-uniform steerer tube 100, an observer viewing only the outer surface of non-uniform steerer tube 100 would not be able to visually detect any difference between a conventional steerer tube and the present non-uniform steerer tube 100. Hence, the beneficial features of the present non-uniform steerer tube 100 are clandestine, and remain hidden to an observer viewing only the outer surface of non-uniform steerer tube 100.

Figure 7:
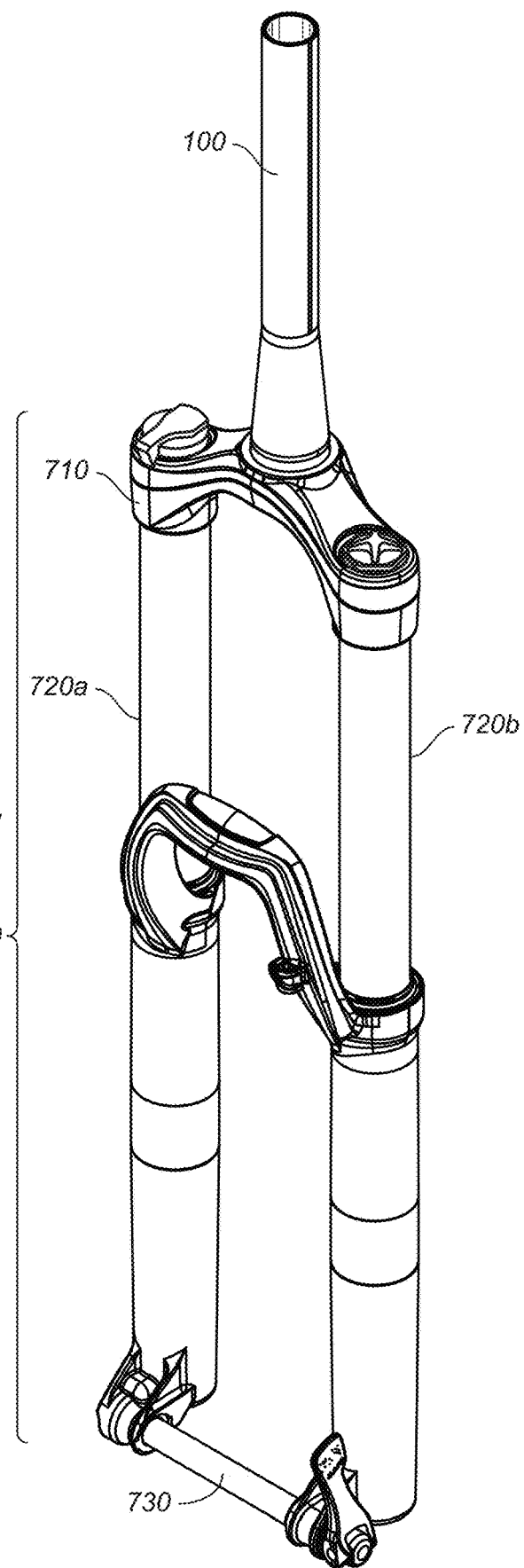
FIG. 7 is a perspective view of a steerer tube and crown, in accordance with an embodiment of the present invention.

Referring now to FIG. 7, a perspective view of a steerer tube 100 coupled with fork assembly 700 is shown in accordance with an embodiment. In one embodiment, fork assembly 700 includes a crown 710, fork leg 720*a*, and fork leg 720*b*. An axle 730 is shown at the lower portion of the fork assembly 700. The axle 730 would be placed through the center of a front wheel and about which the front wheel rotates. In one embodiment, e.g., a duel legged fork setup, axle 730 is removably coupled to fork leg 720*a* and fork leg 720*b*, thereby coupling the front wheel to the fork assembly 700.

Although FIG. 7 shows the steerer tube 100 coupled with fork assembly 700, in one embodiment, the steerer tube 100 could be coupled initially only be coupled with crown 710 which would include opening(s) to allow for the later addition of one or more of the fork legs. In one embodiment, the forks leg(s) would be added at a later point in the assembly process. Thus, the steerer tube 100 would be aligned with the crown 710 at the time of assembly. In one embodiment, one or both of steerer tube 100 and crown 710 could be composite, could be built as a single composite, could be a single piece-metal form, or the like.

Figure 8:
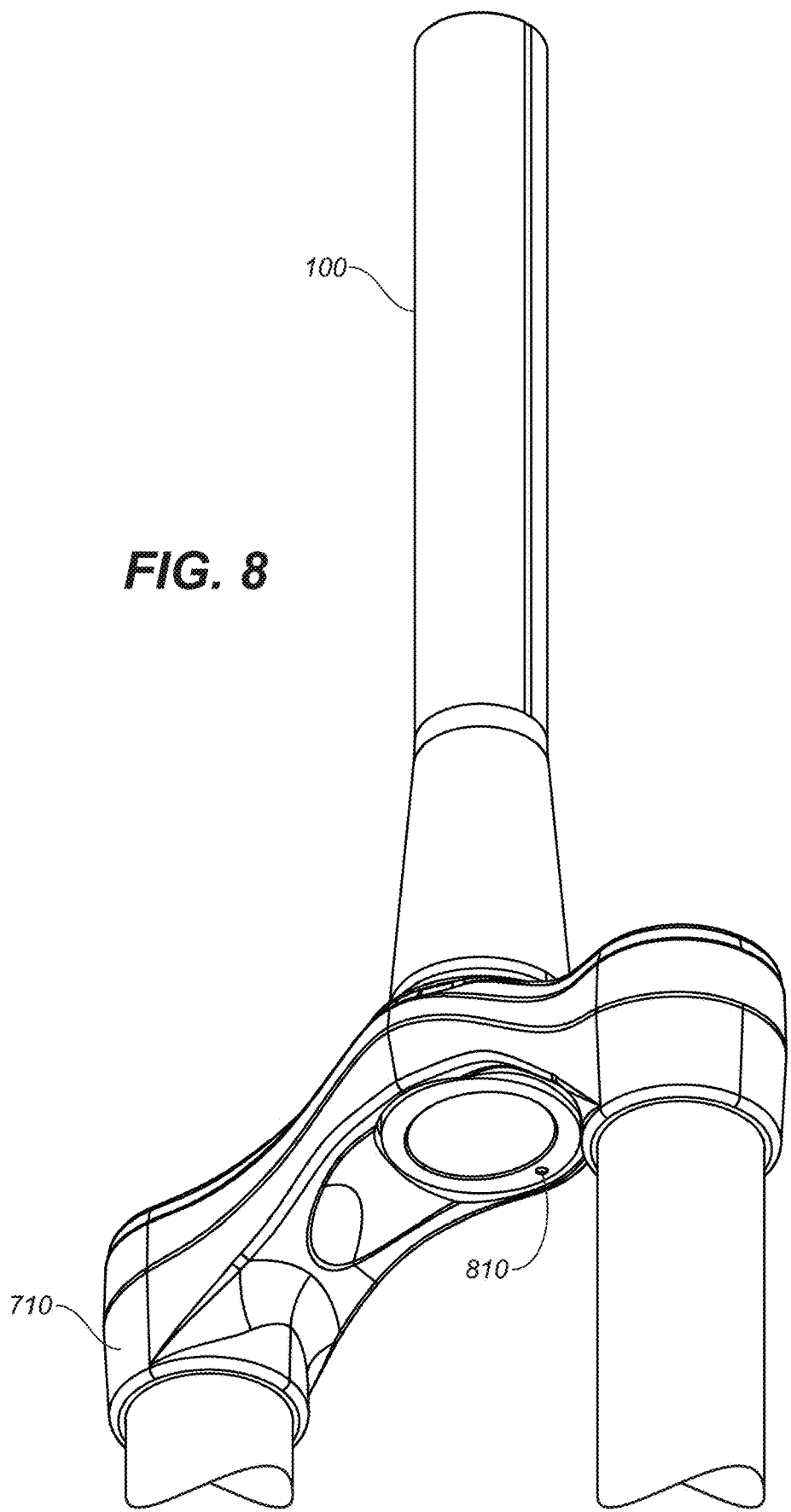
FIG. 8 is a perspective view of a steerer tube coupled to the crown that includes an example alignment mark, in accordance with an embodiment of the present invention.

FIG. 8 is a perspective view of a steerer tube 100 coupled to a crown 710 that includes an example alignment mark 810 in accordance with an embodiment. For example, during the assembly process, the alignment mark 810 would allow the proper designated alignment during the assembly process such that steerer tube 100 would be properly aligned with the crown. Again, in one embodiment, the crown 710 and steerer tube 100 would be aligned prior to the addition of the fork leg(s) to the crown. In another embodiment, the crown 710 and steerer tube 100 would be aligned after the addition of the fork leg(s) to the crown 710. In one embodiment, steerer tube 100 could be circular, could have a lasermark, could be geometrically shaped other than round, or the like.

In one embodiment, the alignment mark 810 would be used when the steerer tube 100 is non-uniform, when the steerer tube 100 is uniform, when the steerer tube 100 is directional or includes a non-axisymmetric feature, and the like. For example, a directional or non-axisymmetric steerer tube 100 could have a design that is uniform in exterior geometry but structurally stronger in a defined direction. Thus, steerer tube 100 would be mounted to the crown 710 in the orientation that allows the expected direction of the largest forces applied to steerer tube 100, during a ride, to act in the same direction as the structurally stronger defined direction of steerer tube 100.

Figure 9:
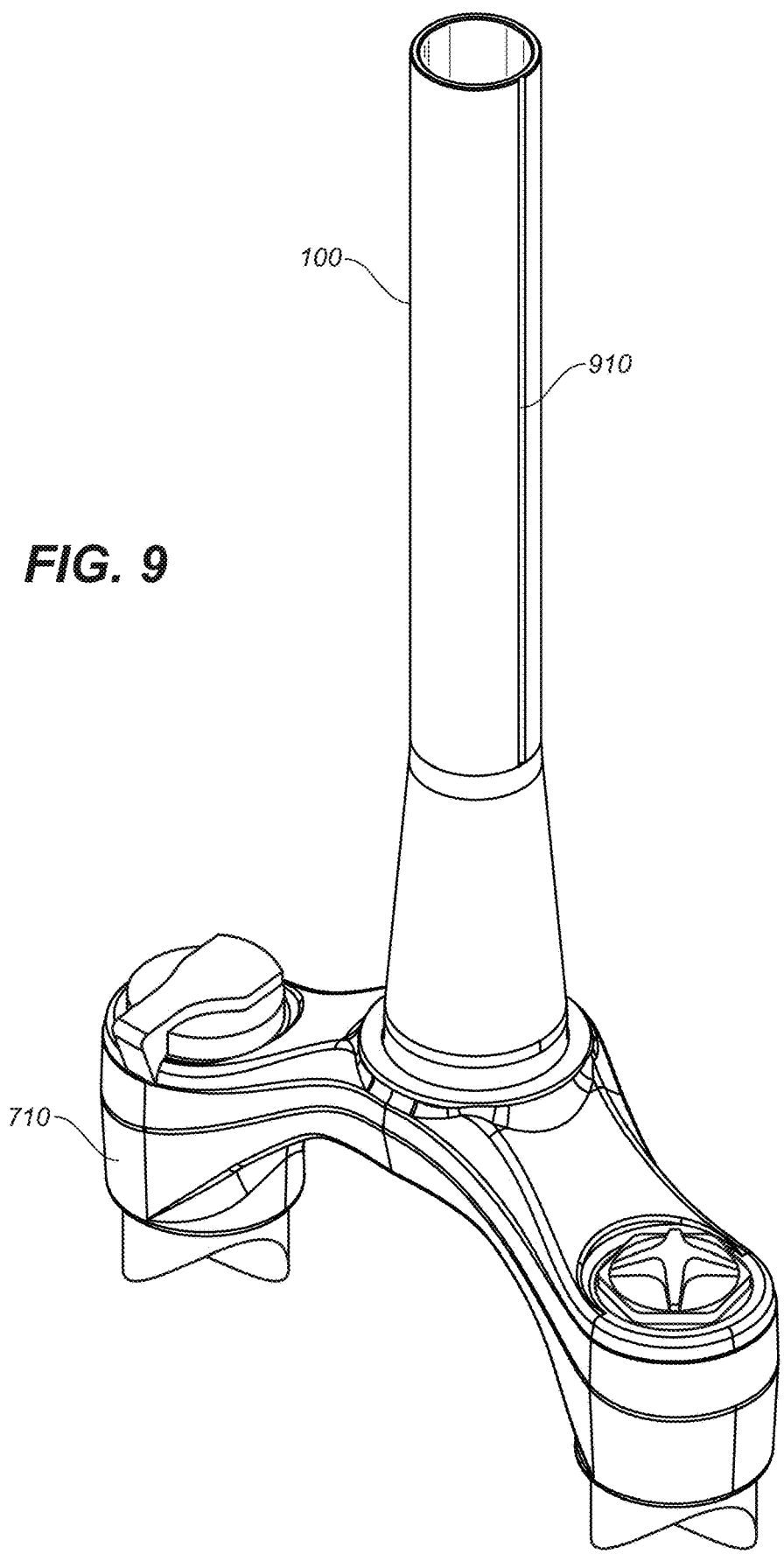
FIG. 9 is a perspective view of the steerer tube coupled to the crown that includes an alignment mark along a portion of the length of the steerer tube, in accordance with an embodiment of the present invention.

FIG. 9 is a perspective view of the steerer tube 100 coupled to a crown 710 that includes an alignment feature 910 along a portion of the length of steerer tube 100 in accordance with an embodiment. In one embodiment, alignment feature 910 is a male alignment feature, e.g., it protrudes from steerer tube 100 along a portion of the length of steerer tube 100. In one embodiment, alignment feature 910 is a female alignment feature, e.g., it is a channel or grove along a portion of the length of steerer tube 100.

Figure 10A:
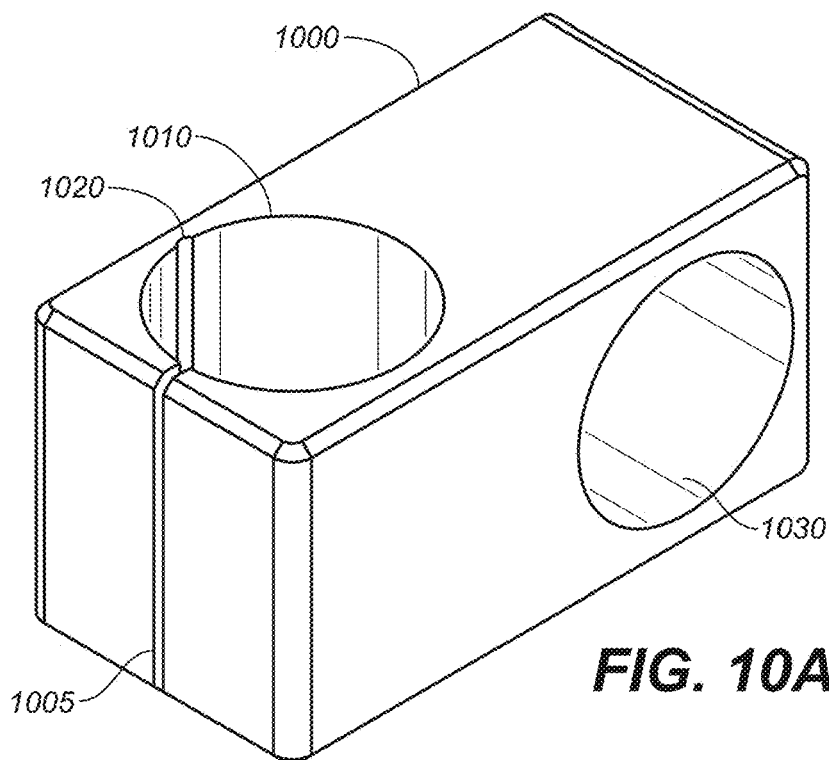
FIG. 10A is a perspective view of a stem with an alignment feature, in accordance with an embodiment of the present invention.

FIG. 10A is a perspective view of a stem 1000 with an alignment feature 1020 in steerer tube receiver opening 1010 in accordance with an embodiment. In one embodiment, stem 1000 also includes a handlebar opening 1030 and an opening 1005. In general, handlebar opening 1030 is for receiving and mechanically coupling one or more components of the handlebars for the bike with one or more of the front end components, thereby allowing the rider to steer the bicycle.

In one embodiment, alignment feature 1020 is a female alignment feature, e.g., it is a channel or grove within steerer tube receiver opening 1010. In one embodiment, alignment feature 1020 is a male alignment feature, e.g., it protrudes into steerer tube receiver opening 1010. In one embodiment, opening 1005 could be used as part of a retaining design to allow stem 1000 to be tightened to steerer tube 100. In one embodiment, opening 1005 could be a friction type retaining characteristic that allows the stem 1000 to be moved down a steerer tube with an expanding radius until it is frictionally coupled. In one embodiment, a fastener could be used in conjunction with opening 1005, the fastener allowing the stem 1000 to be moved down a steerer tube 100 and then tightened to reduce the size of steerer tube receiver opening 1010 and thereby couple the stem 1000 with the steerer tube 100.

Figure 10B:
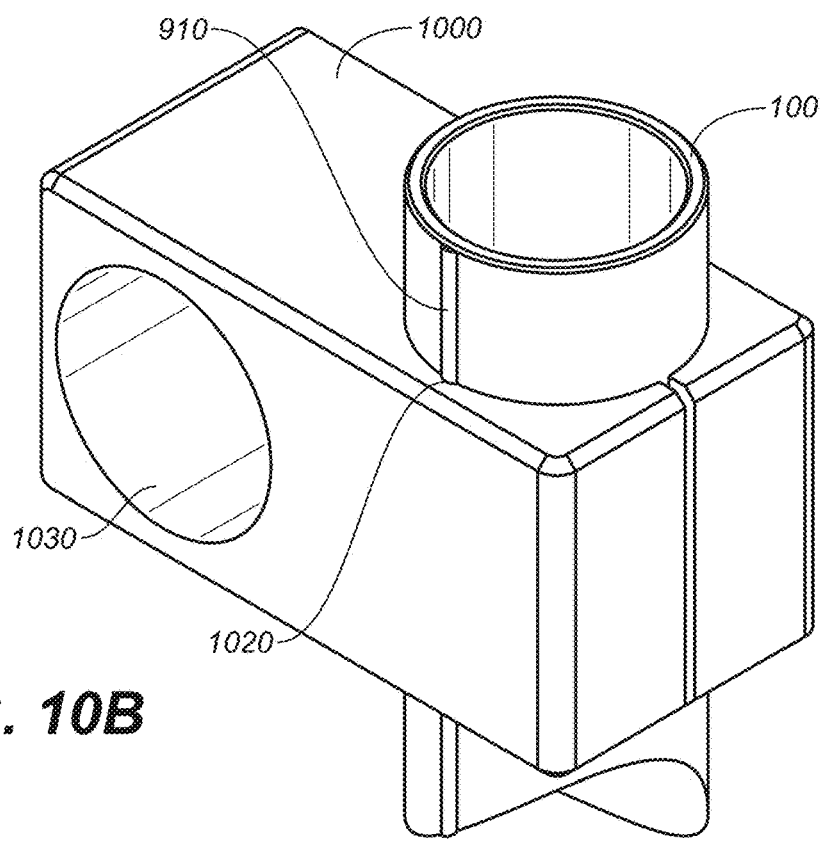
FIG. 10B is a perspective view of a stem with an alignment feature aligned with the alignment feature of the steerer tube, in accordance with an embodiment of the present invention.

FIG. 10B is a perspective view of a stem 1000 with an alignment feature 1020 aligned with the alignment feature 910 of the steerer tube 100, in accordance with an embodiment. In one embodiment, stem 1000 also includes a handlebar opening 1030. In one embodiment, alignment feature 1020 is a female alignment feature, e.g., it is a channel or grove within steerer tube receiver opening 1010. In one embodiment, alignment feature 910 of the steerer tube 100 is a male alignment feature, e.g., it protrudes from steerer tube 100. Because of the alignment features 1020 and 910, the stem 1000 be properly oriented with the steerer tube 100 when the stem 1000 is mounted onto steerer tube 100. As stated above, this alignment will ensure that the design characteristics of steerer tube 100 are properly aligned and oriented with respect to the handlebar that will be held by stem 1000. This will allow the engineering features of the axisymmetric steerer tube 100 to be properly oriented even if stem 1000 is installed or changed by a third party.

Figure 11A:
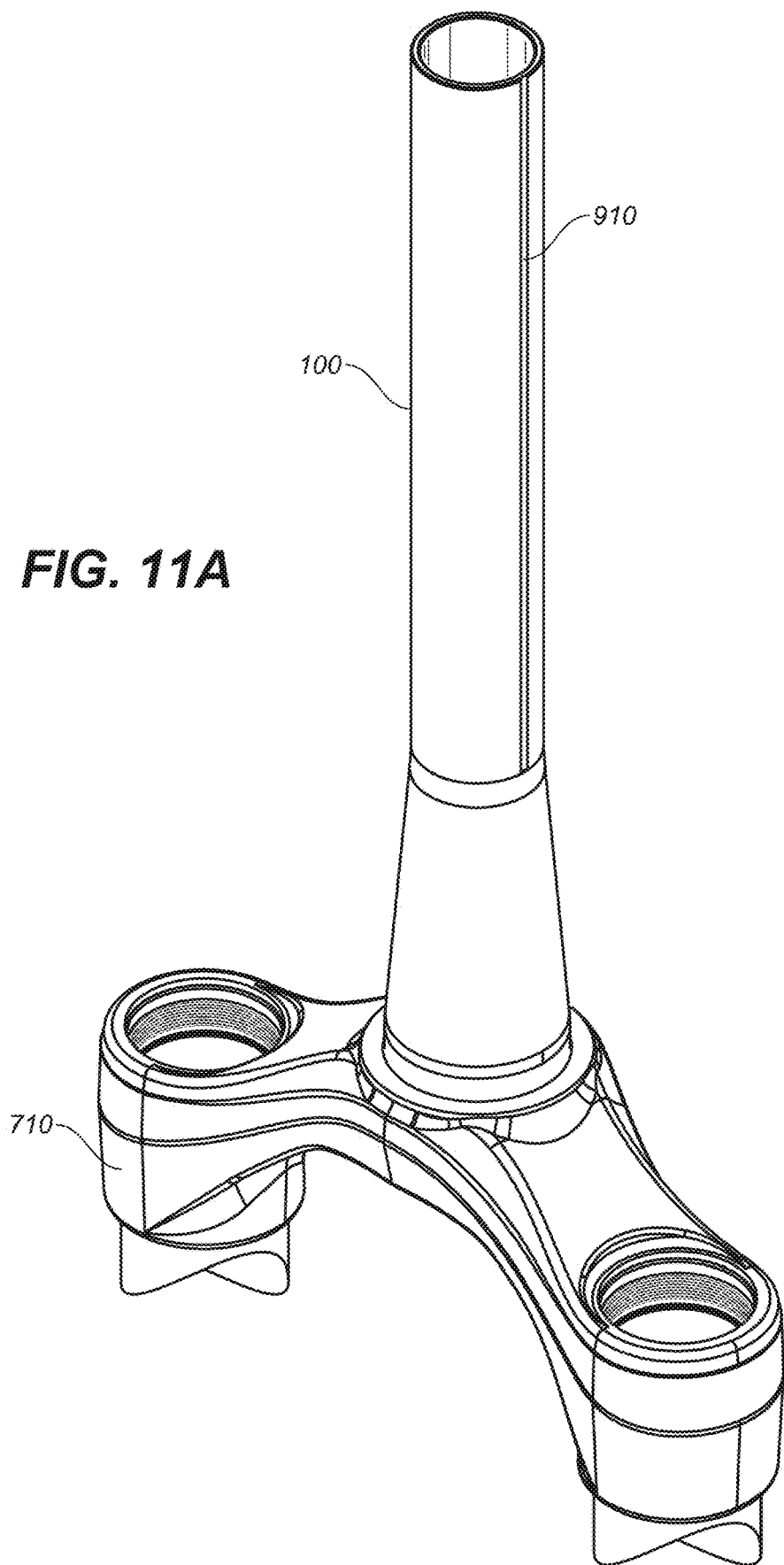
FIG. 11A is a perspective view of the steerer tube coupled to a crown that includes an alignment feature along a portion of the length of steerer tube taken from an angle different from that of FIG. 9, in accordance with an embodiment of the present invention.

FIG. 11A is a perspective view of the steerer tube 100 coupled to a crown 710 that includes an alignment feature 910 along a portion of the length of steerer tube 100 taken from an angle different from that of FIG. 9, in accordance with an embodiment. In one embodiment, the alignment features 910 is a female alignment feature, e.g., it is a channel or grove along a portion of the length of steerer tube 100.

Figure 11B:
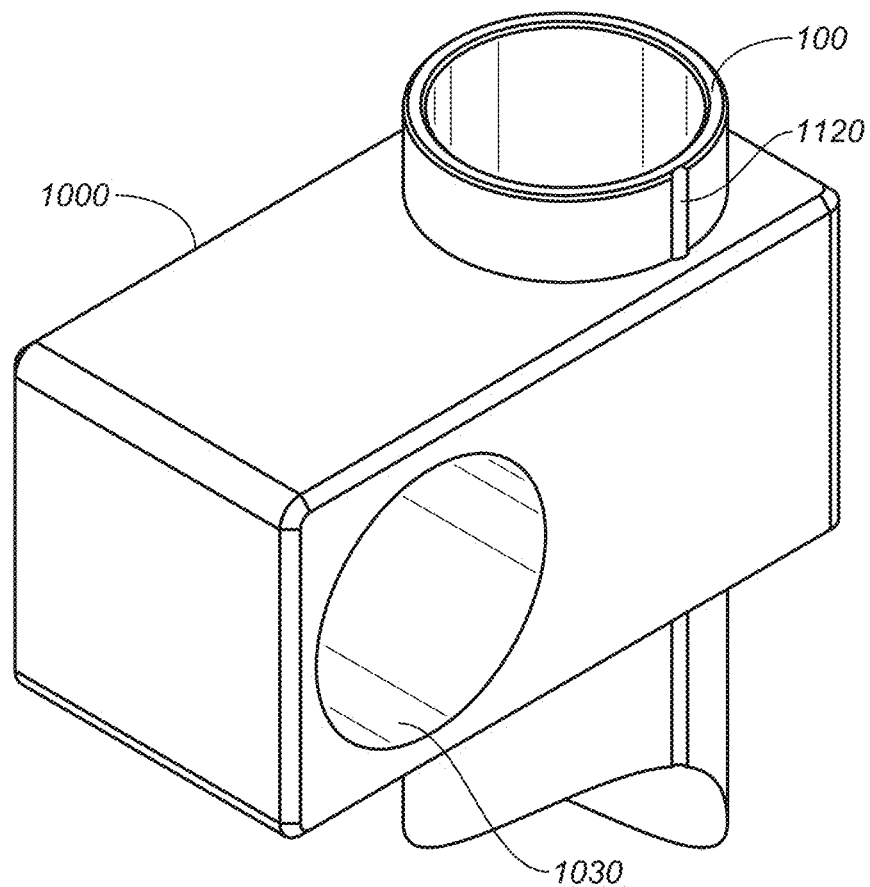
FIG. 11B is a perspective view of the stem with a female alignment feature aligned with a female alignment feature of the steerer tube and using a pin to align the two features, in accordance with an embodiment.

FIG. 11B is a perspective view of the stem 1000 with a female alignment feature 1020 aligned with the female alignment feature 910 of the steerer tube 100 using a pin 1120 to align the two features (e.g., 1020 and 910), in accordance with an embodiment. In one embodiment, by using a separate pin 1120 to act as the aligning tool for the female versions of both alignment feature 1020 of the stem 1000 and alignment feature 910 of steerer tube 100, a number of advantages can be obtained. For example, the use of female alignment features in both parts will allow either part to be used in legacy or non-aligned configurations That is, one or more of the components could be used in an alignment usage optional format. For example, if the user was upgrading parts, they could upgrade the stem 1000 to a stem with female alignment features 1020 while being able to continue using their legacy non-aligned-type steerer tube. Thus, one or more aligned components could be upgraded piecemeal, or the like.

In one embodiment, the usage optional factor could be a "direct alignment" concept. For example, if both alignment feature 1020 of the stem 1000 and alignment feature 910 of steerer tube 100 are female, when the pin 1120 is not present, stem 1000 can be used on any steerer tube 100, and any steerer tube 100 can be used with any stem 1000. In contrast, when pin 1120 is present and in use, mechanical alignment would be required.

Figure 12:
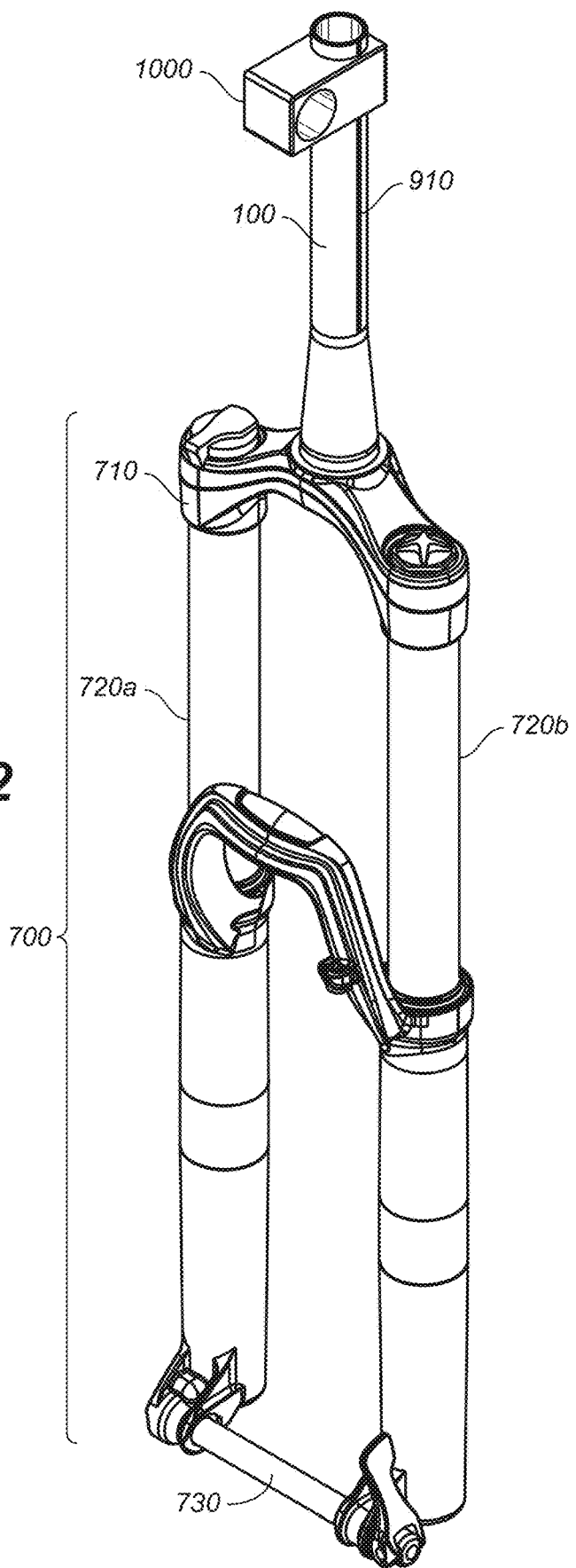
FIG. 12 is a perspective view of the stem coupled with the steerer tube that is coupled with the fork assembly, in accordance with an embodiment.

FIG. 12 is a perspective view of stem 100 coupled with steerer tube 100 which is coupled with fork assembly 700 in accordance with an embodiment. In one embodiment, fork assembly 700 includes a crown 710, fork leg 720a, and fork leg 720b. An axle 730 is shown at the lower portion of the fork assembly 700. The axle 730 would be placed through the center of a front wheel and about which the front wheel rotates. In one embodiment, e.g., a duel legged fork setup, axle 730 is removably coupled to fork leg 720a and fork leg 720b, thereby coupling the front wheel to the fork assembly 700.

Keyed Headset Spacer

Figure 13A:
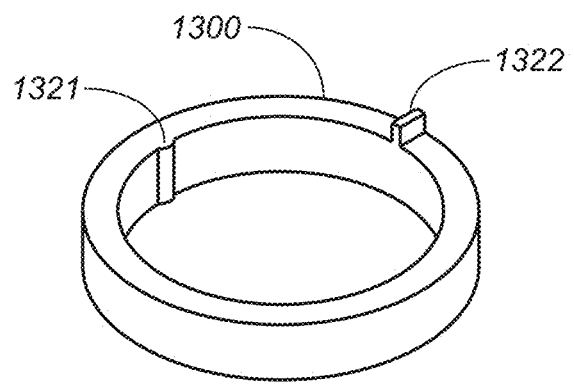
FIG. 13A is a perspective view of a keyed headset spacer with two alignment features, in accordance with an embodiment.

FIG. 13A is a perspective view of a keyed headset spacer 1300 with two alignment features, in accordance with an embodiment. For example, keyed headset spacer 1300 will have a first male alignment feature 1321 that will align with the female alignment feature 910 of steerer tube 100. Headset space 1300 will also have a second male alignment feature 1322 that will align with the opening 1005 of stem 1000. Thus, when keyed headset spacer 1300 is properly installed, stem 1000 will be properly aligned with steerer tube 100.

Figure 13B:
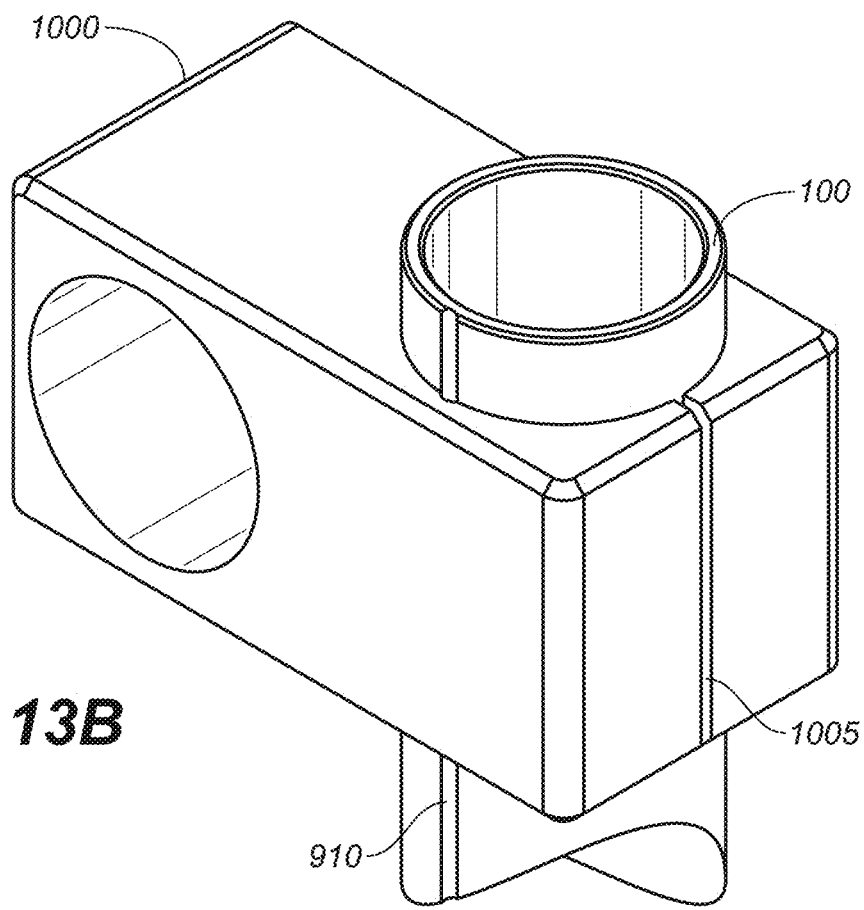
FIG. 13B is a perspective view of the stem installed onto a steerer tube with a female alignment feature, in accordance with an embodiment.

FIG. 13B is a perspective view of the stem 1000 installed onto a steerer tube 100, in accordance with an embodiment. In one embodiment, the steerer tube has a female alignment feature 910 and the stem 1000 has no alignment feature 1020 but does have opening 1005. In another embodiment, stem 1000 includes a female alignment feature 1020 and also opening 1005.

Figure 13C:
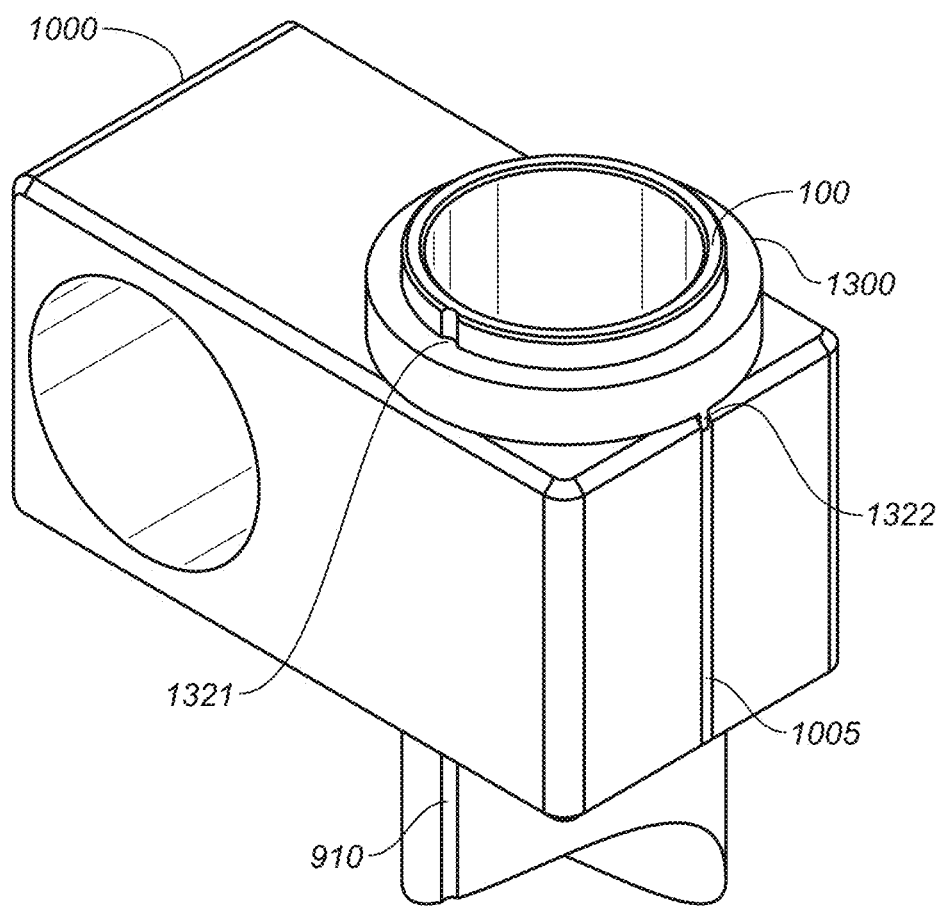
FIG. 13C is a perspective view the keyed headset spacer of FIG. 13A aligning the stem and the steerer tube of FIG. 13B, in accordance with an embodiment.

FIG. 13C is a perspective view the keyed headset spacer 1300 of FIG. 13A aligning the stem 1000 and the steerer tube 100 of FIG. 13B, in accordance with an embodiment. In one embodiment, the first male alignment feature 1321 of keyed headset spacer 1300 will align with the female alignment feature 910 of steerer tube 100. In addition, the second male alignment feature 1322 of keyed headset spacer 1300 will align with opening 1005 of stem 1000. As such, the proper installation of keyed headset spacer 1300 will cause stem 1000 to be properly aligned with steerer tube 100.

In one embodiment, the use of the keyed headset spacer 1300 will provide another usage optional factor, e.g., an "indirect alignment" concept. For example, as previously stated, if both alignment feature 1020 of the stem 1000 and alignment feature 910 of steerer tube 100 are female the stem 1000 and/or the steerer tube 100 could be used in a configuration that did not include mechanical alignment. Moreover, when a normal headset spacer is used, the stem 1000 and the steerer tube 100 could still be used outside of mechanical alignment. However, when the keyed headset spacer 1300 is used, mechanical alignment between the stem 1000 and the steerer tube 100 will be necessary to properly install the keyed headset spacer 1300.

Top Cap

Figure 14A:
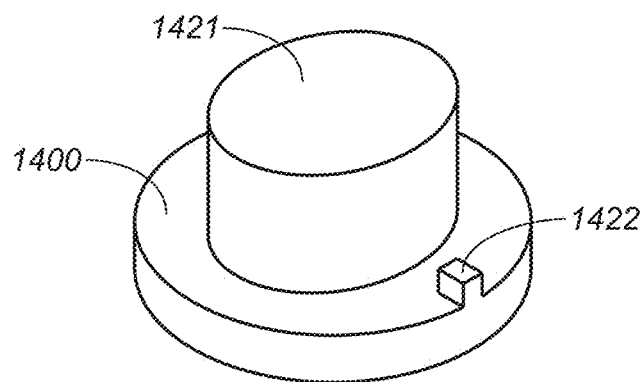
FIG. 14A is a perspective view of a top cap with two alignment features, in accordance with an embodiment.

FIG. 14A is a perspective view of a top cap 1400 with two alignment features, in accordance with an embodiment. For example, top cap 1400 will have a first male alignment feature 1421 that will align within inner surface 104 of steerer tube 100. As stated herein, in one embodiment, inner surface 104 of non-uniform steerer tube 100 has a non-uniform diameter at, at least, one location along the axial span of non-uniform steerer tube 100. Thus, first male alignment feature 1421 of top cap 1400 can be designed to directionally fit within the non-uniform inner surface 104 providing a predefined orientation between steerer tube 100 and top cap 1400.

Top cap 1400 will also have a second male alignment feature 1422 that will align with an indent 1375 in keyed headset spacer 1300. Thus, when top cap 1400 and keyed headset spacer 1300 are properly installed, stem 1000 will be properly aligned with steerer tube 100 regardless of whether or not the non-round steerer tube 100 has an alignment feature 910 and/or stem 1000 has an alignment feature 1020.

Figure 14B:
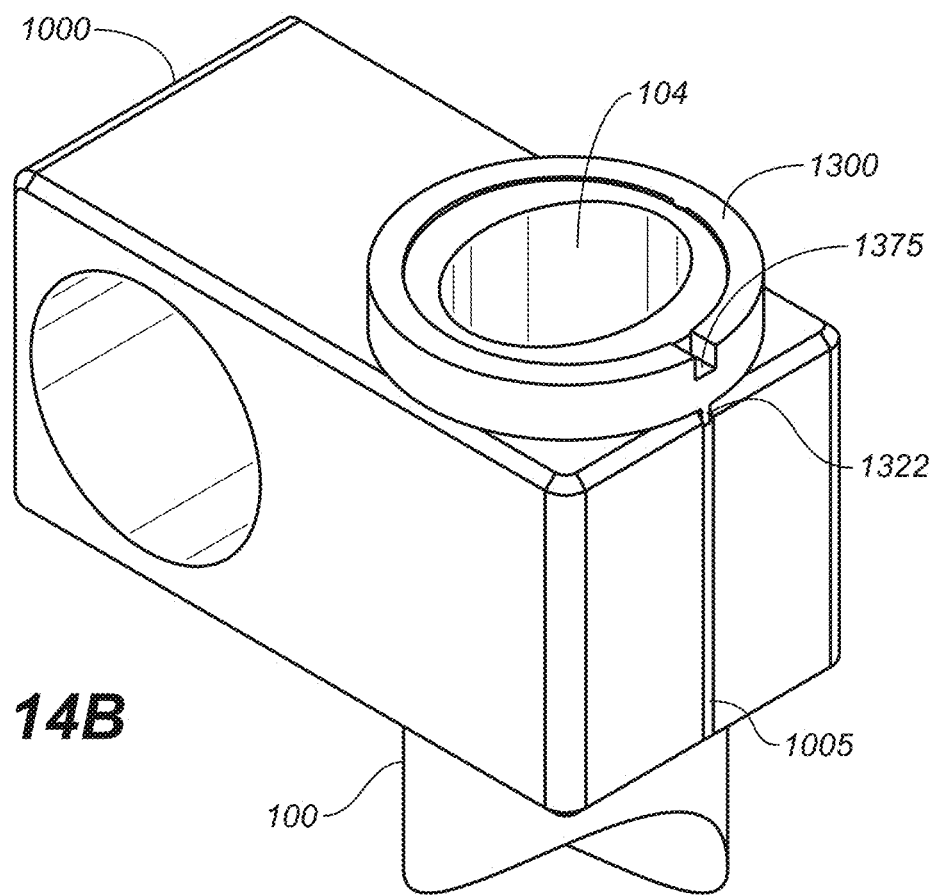
FIG. 14B is a perspective view of the stem installed onto a steerer tube in conjunction with the keyed headset spacer, in accordance with an embodiment.

FIG. 14B is a perspective view of the stem 1000 installed onto a steerer tube 100 in conjunction with keyed headset spacer 1300, in accordance with an embodiment. In one embodiment, the stem 1000 does not have an alignment feature 1020 and the steerer tube 100 does not have an alignment feature 910. In one embodiment, the steerer tube 100 has a female alignment feature 910 and the stem 1000 has no alignment feature 1020 but does have opening 1005. In another embodiment, the steerer tube 100 does not have an alignment feature 910 but the stem 1000 includes the female alignment feature 1020 and also opening 1005. In yet another embodiment, the stem 1000 has alignment feature 1020 and the steerer tube 100 has alignment feature 910. In one embodiment, the second male alignment feature 1322 of keyed headset spacer 1300 will align with opening 1005 of stem 1000. Further, in one embodiment, there is an indent 1375 on the top side of keyed headset spacer 1300.

Figure 14C:
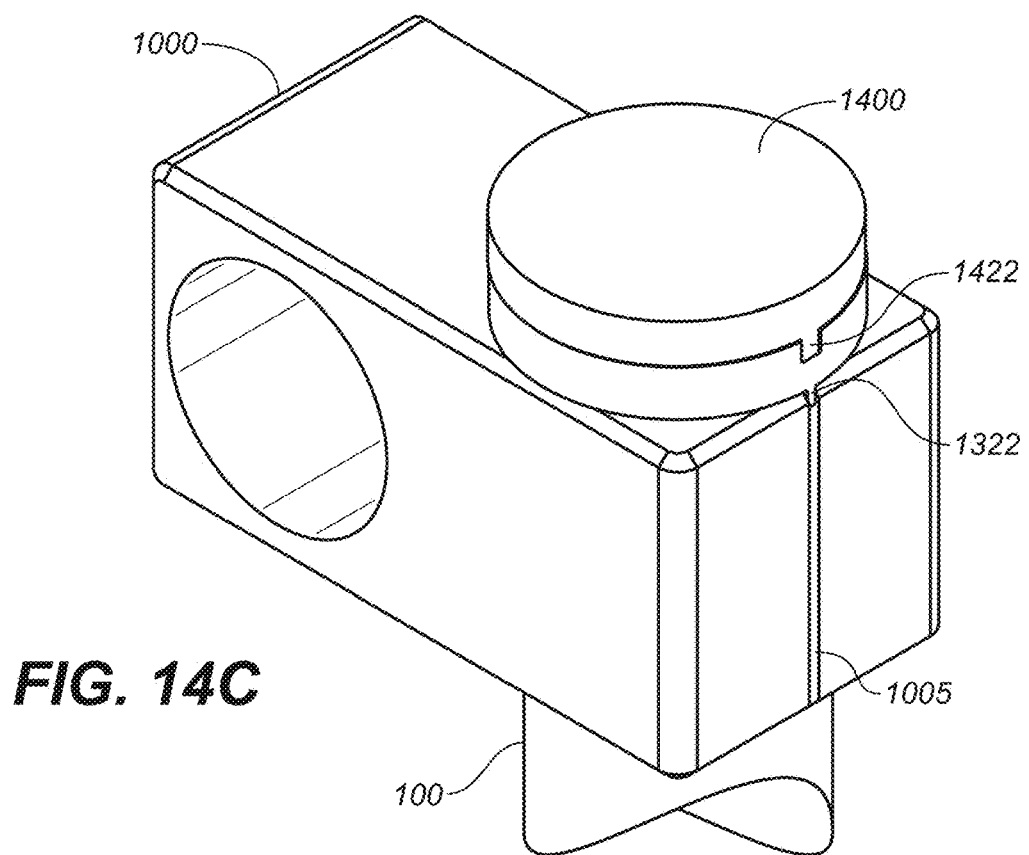
FIG. 14C is a perspective view the top cap of FIG. 14A acting in conjunction with the keyed headset spacer to aligning the stem and the steerer tube of FIG. 14B, in accordance with an embodiment.

FIG. 14C is a perspective view the top cap 1400 of FIG. 14A acting in conjunction with the keyed headset spacer 1300 to aligning the stem 1000 and the steerer tube 100 of FIG. 14B, in accordance with an embodiment. In one embodiment, during installation, second male alignment feature 1422 of top cap 1400 will align with indent 1375 in keyed headset spacer 1300, while the first male alignment feature 1321 of keyed headset spacer 1300 will also be aligned with opening 1005 of stem 1000. In addition, the first male alignment feature 1421 of top cap 1400 will directionally fit within the non-uniform inner surface 104 providing a predefined orientation between steerer tube 100 and top cap 1400. As such, the proper installation of top cap 1400 and keyed headset spacer 1300 will cause stem 1000 to be properly aligned with steerer tube 100.

Figure 14D:
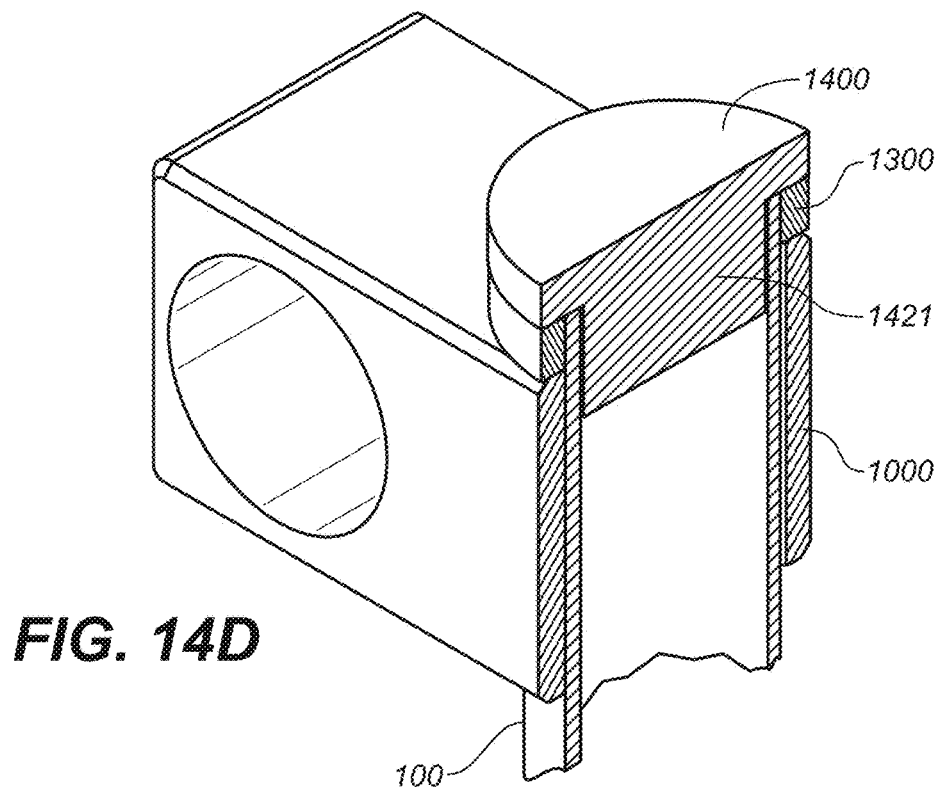
FIG. 14D is a cross-sectional view of the top cap acting in conjunction with the keyed headset spacer to align the stem and the steerer tube of FIG. 14C, in accordance with an embodiment of the present invention.

FIG. 14D is a sectional view FIG. 14C, where the top cap 1400 of FIG. 14A acting in conjunction with the keyed headset spacer 1300 to aligning the stem 1000 and the steerer tube 100 of FIG. 14B, in accordance with an embodiment.

In one embodiment, the use of top cap 1400 will provide another usage optional factor, e.g., an "indirect alignment" concept. For example, as previously stated, if both alignment feature 1020 of the stem 1000 and alignment feature 910 of steerer tube 100 are female the stem 1000 and/or the steerer tube 100 could be used in a configuration that did not include mechanical alignment. Moreover, when a normal top cap is used, the stem 1000 and the steerer tube 100 could still be used outside of mechanical alignment. However, when the top cap 1400 is properly installed in conjunction with a keyed headset spacer 1300, mechanical alignment between the stem 1000 and the steerer tube 100 will occur. Further, the top cap 1400 and keyed headset spacer 1300 can provide mechanical alignment between the stem 1000 and the steerer tube 100 regardless of whether steerer tube 100 has alignment feature 910 or stem 1000 has alignment feature 1020.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A fork assembly comprising:
   a steerer tube; and
   a crown, wherein said steerer tube is fixedly aligned to said crown in a predefined orientation at a time of manufacture, wherein said steerer tube is structurally designed to provide additional support for said steerer tube along only at least one direction which is subjected to greater stress during a use of said steerer tube, said steerer tube having an outer surface of a uniform diameter.

2. The fork assembly of claim 1, further comprising:
a steerer alignment mark on said steerer tube, said steerer alignment mark based on said orientational structural design of said steerer tube; and
a crown alignment mark on said crown, wherein said steerer alignment mark is aligned with said crown alignment mark to obtain said predefined orientation when said steerer tube is fixedly aligned to said crown at said time of manufacture.

3. The fork assembly of claim 1, wherein said steerer tube and said crown are composite.

4. The fork assembly of claim 1, further comprising:
a male stem alignment feature on said steerer tube; and
a stem to mount on said steerer tube, said stem comprising:
  a steerer tube receiver opening to allow said stem to mount on said steerer tube, and
  a female steerer tube alignment feature within said steerer tube receiver opening,
an alignment of said male stem alignment feature with said female steerer tube alignment feature to ensure said stem is mounted to said steerer tube in a predefined orientation.

5. The fork assembly of claim 1, further comprising:
a female stem alignment feature on said steerer tube;
a stem to mount on said steerer tube, said stem comprising:
  a steerer tube receiver opening to allow said stem to mount on said steerer tube, and
  a female steerer tube alignment feature within said steerer tube receiver opening; and
a pin for insertion within an opening formed when said female stem alignment feature is properly aligned with said steerer tube alignment feature,
  said inserted pin to properly orient said stem with said steerer tube in a predefined orientation.

6. The fork assembly of claim 1, further comprising:
a female stem alignment feature on said steerer tube;
a stem to mount on said steerer tube, said stem comprising:
  a steerer tube receiver opening to allow said stem to mount on said steerer tube, and
  a steerer tube retention opening to tighten said stem about said steerer tube after said stem is mounted on said steerer tube; and
a keyed headset spacer having a first male alignment feature and a second male alignment feature,
  said first male alignment feature for insertion within said female stem alignment feature on said steerer tube, and
  said second male alignment feature for insertion within said steerer tube retention opening of said stem,
  an installation of said keyed headset spacer properly aligns said stem with said steerer tube in a predefined orientation.

7. The fork assembly of claim 6, wherein said stem further comprises:
a female steerer tube alignment feature within said steerer tube receiver opening.

8. The fork assembly of claim 1, wherein said steerer tube further comprises:
a non-axisymmetric inner surface, said non-axisymmetric inner surface has a non-uniform diameter length at a location along an axial length of said steerer tube.

9. The steerer tube of claim 8, wherein said non-axisymmetric inner surface has a shape selected from a group consisting of: oval-shaped, egg-shaped, elliptically-shaped, rectangularly-shaped and some combination of said shapes.

10. The fork assembly of claim 8, further comprising:
a stem to mount on said steerer tube, said stem comprising:
  a steerer tube receiver opening to allow said stem to mount on said steerer tube, and
  a steerer tube retention opening to tighten said stem about said steerer tube after said stem is mounted on said steerer tube; and
a keyed headset spacer having a male alignment feature on a bottom side thereof, and a female alignment feature on a top side thereof,
  said male alignment feature for insertion within said steerer tube retention opening of said stem; and
a top cap having a first male alignment feature and a second male alignment feature,
  said first male alignment feature for insertion within said non-axisymmetric inner surface of said steerer tube, and
  said second male alignment feature for insertion within said female alignment feature on said keyed headset spacer, and
  an installation of said top cap in combination with said keyed headset spacer properly aligns said stem with said steerer tube in a predefined orientation.

11. The fork assembly of claim 10, wherein said stem further comprises:
a female steerer tube alignment feature within said steerer tube receiver opening.

12. The fork assembly of claim 10, further comprising:
a female stem alignment feature on said steerer tube.

13. A fork assembly comprising:
a steerer tube orientationally structurally designed to provide additional support for said steerer tube in at least one direction which is subjected to greater stress during a use of said steerer tube, wherein said steerer tube is structurally designed to provide additional support for said steerer tube along only at least one direction which is subjected to greater stress during a use of said steerer tube, said steerer tube having an outer surface of a uniform diameter; and
a crown, wherein said steerer tube is fixedly aligned to said crown in a predefined orientation at a time of manufacture.

14. The fork assembly of claim 13, further comprising:
a steerer alignment mark on said steerer tube, said steerer alignment mark based on said orientational structural design of said steerer tube; and
a crown alignment mark on said crown, wherein said steerer alignment mark is aligned with said crown alignment mark to obtain said predefined orientation when said steerer tube is fixedly aligned to said crown at said time of manufacture.

15. The fork assembly of claim 13, further comprising:
a male stem alignment feature on said steerer tube; and
a stem to mount on said steerer tube, said stem comprising:
  a steerer tube receiver opening to allow said stem to mount on said steerer tube, and
  a female steerer tube alignment feature within said steerer tube receiver opening, an alignment of said male stem alignment feature with said female steerer tube alignment feature to ensure said stem is mounted to said steerer tube in a predefined orientation.

16. The fork assembly of claim 13, further comprising:
a female stem alignment feature on said steerer tube;
a stem to mount on said steerer tube, said stem comprising:
   a steerer tube receiver opening to allow said stem to mount on said steerer tube, and
   a female steerer tube alignment feature within said steerer tube receiver opening; and
a pin for insertion within an opening formed when said female stem alignment feature is properly aligned with said steerer tube alignment feature,
   said inserted pin to properly orient said stem with said steerer tube in a predefined orientation.

17. The fork assembly of claim 13, further comprising:
a female stem alignment feature on said steerer tube;
a stem to mount on said steerer tube, said stem comprising:
   a steerer tube receiver opening to allow said stem to mount on said steerer tube, and
   a steerer tube retention opening to tighten said stem about said steerer tube after said stem is mounted on said steerer tube; and
a keyed headset spacer having a first male alignment feature and a second male alignment feature,
   said first male alignment feature for insertion within said female stem alignment feature on said steerer tube, and
   said second male alignment feature for insertion within said steerer tube retention opening of said stem,
   an installation of said keyed headset spacer properly aligns said stem with said steerer tube in a predefined orientation.

18. The fork assembly of claim 13, wherein said steerer tube further comprises:
a non-axisymmetric inner surface, said non-axisymmetric inner surface has a non-uniform diameter length at a location along an axial length of said steerer tube, said non-axisymmetric inner surface has a shape selected from said group consisting of: oval-shaped, egg-shaped, elliptically-shaped, rectangularly-shaped and some combination of said shapes.

19. The fork assembly of claim 18, further comprising:
a stem to mount on said steerer tube, said stem comprising:
   a steerer tube receiver opening to allow said stem to mount on said steerer tube, and
   a steerer tube retention opening to tighten said stem about said steerer tube after said stem is mounted on said steerer tube; and
a keyed headset spacer having a male alignment feature on a bottom side thereof, and a female alignment feature on a top side thereof,
   said male alignment feature for insertion within said steerer tube retention opening of said stem; and
a top cap having a first male alignment feature and a second male alignment feature,
   said first male alignment feature for insertion within said non-axisymmetric inner surface of said steerer tube, and
   said second male alignment feature for insertion within said female alignment feature on said keyed headset spacer, and
   an installation of said top cap in combination with said keyed headset spacer properly aligns said stem with said steerer tube in a predefined orientation.

* * * * *